UNITED STATES PATENT OFFICE.

RICHARD L. LLOYD, OF NEW YORK, N. Y., ASSIGNOR TO DWIGHT & LLOYD METALLURGICAL COMPANY, OF NEW YORK, N. Y., A CORPORATION OF NEW JERSEY.

TREATMENT OF LIXIVIATION-RESIDUE ZINC.

1,378,822. Specification of Letters Patent. Patented May 17, 1921.

No Drawing. Application filed October 10, 1919. Serial No. 329,864.

*To all whom it may concern:*

Be it known that I, RICHARD L. LLOYD, a citizen of the United States, residing at New York, in the county of New York and State of New York, have invented certain new and useful Improvements in the Treatment of Lixiviation-Residue Zinc, of which the following is a specification.

This invention relates to a method of obtaining zinc from ores, or masses of material of either of several constituents from which it has heretofore been found impossible or exceedingly difficult, to separate all of the metal.

That the characteristics of the method to be herein presented may be readily understood, I will specifically mention (but merely as a type of the zinc-bearing materials containing quantities of zinc which it is desired to completely separate), the solid residue material which remains in a zinc lixiviation apparatus after that part of the zinc has been dissolved out which was in soluble form when introduced to the lixiviation apparatus.

The lixiviation stage is frequently followed by electrolytic treatment, but there are other methods employed for separating the zinc.

A series of steps commonly followed (in treating these ores preliminarily to lixiviation) which can be kept in mind, for the purpose of illustration, is as follows:

A mass of finely crushed zinc sulfid ore is placed upon a furnace hearth and a shallow stratum is formed. It can be regarded as containing 40 per cent. of zinc (approximately of course), 25 per cent. of sulfur, 10 per cent. of silica, together with varying percentages of other metals as iron, lead, gold, silver, etc.

The ore stratum on the hearth, as assumed illustratively, is subjected to the action of streams of flowing volumes of heated gases, or products of combustion coming from an external source (as a fire-box), relatively remote from the ore mass and passing over the stratum to a stack. Air in regulated quantities is also admitted to the region of the mass. The quantities of the heat applied and the oxygen are so adjusted as to form as large a proportion of zinc sulfate as possible, the various reactions being such as usually occur during this widely practised treatment.

In practice it is found that a relatively large quantity of zinc oxid is also formed, supplemental to the zinc sulfate, even when the temperature is kept low.

After the first treatment, thus briefly referred to, the material is delivered to the lixiviation apparatus. Diluted sulfuric acid is permitted to leach through the mass. The zinc sulfate is dissolved out. The zinc oxid is sulfated and becomes soluble and is carried off in solution.

The fluid containing the dissolved sulfate is after the removal of impurities subjected to the action of, for example, electrolysis for the purpose of separating the metal.

There are left in the lixiviation apparatus large quantities of undissolved material which I shall herein refer to as the lixiviation residue. In treating many zinc ores it is often found that 20 per cent. of this residue is zinc in an insoluble form.

To obtain this zinc, a practice, more or less crude in character, has been followed of commingling coal with the residue taken from the lixiviation apparatus and subjecting the mass to heat and internal combustion under such conditions that the zinc will be reduced, volatilized and carried off as fumes, which, to a greater or less extent, are condensed or collected in bags or the like.

If this residue of the lixiviation apparatus contains, as is frequently the case, commercially high percentages of other metals such as lead, gold, silver, or the like, it is subjected to one process or another suitable for separating such of these metals as it is desired to obtain.

The present invention (disregarding these collateral matters such as the separation of lead, gold, silver, or the like) relates to a method for treating a zinc-bearing ore mass in such way that all of the zinc can be separated by dissolving it out while it is being treated in the lixiviation apparatus.

In one case I apply my treatment to the ore before any of it has been passed to the lixiviation apparatus. In other cases I follow the earlier steps of the series commonly followed in treatment and, then, after the stages of lixiviation, withdraw the residue and apply thereto my improved treatment preparatory to again lixiviating it.

Before describing, specifically, my method of treatment, I will here call attention to the opinions at present entertained concerning the constitution and characteristics of that part of the ore which contains the zinc which remains insoluble.

Analysis of, and experiments with, these parts of the compound zinc-carrying component of such ores, for example, the zinc-bearing bodies in the residue left after lixiviation, have led to the opinion that the zinc is either in one or another of numerous combinations with other bodies, which combinations are characteristic of the minerals of the silicate and spinel groups, or more particularly in ferrite or ferrate combination, which is quite probable in some cases. These insoluble forms of zinc are produced in the roasting operation instead of the desired sulfate or oxid of zinc, and in the subsequent lixiviation treatment are not dissolved.

I have discovered that that part of the zinc component, found in almost all of the ordinary zinc ores, which refuses to respond to the action of the solvents, is susceptible of being made soluble if it is subjected to a method of treatment involving certain conditions (as to temperatures and in relation to neighboring bodies) which I have also discovered and which conditions and relationships I have found how to predetermine and properly adjust or regulate.

I will first describe the manner in which I treat the residue from lixiviation obtained when the ordinary method is followed and above briefly referred to.

After the first treatment in the desulfurizing furnace and the production of as large a proportion of zinc sulfate as possible with, as above remarked, an accompanying proportion of zinc oxid, and, after the mass from the furnace has been lixiviated and the solution mass therein obtained has been withdrawn and purified for electrolytic treatment, I withdraw the residue, of which, as above remarked, in many cases 20 per cent. is zinc. This in suitably ground or pulverized condition is commingled with coal and the mingled mass is subjected to a second furnace treatment. Some heat may be supplied from an external source; some will be derived from the oxidizing carbon. But one of the important factors is the holding down of the heat to the proper point. It must not, under any circumstances, for good results, be carried to the point where zinc will reduce and vaporize. It is merely raised to a point more or less short of that where zinc reduction occurs, and is maintained at this relatively low point where, as I have found, certain reactions are set up and the zinc component is rendered soluble when it is subjected to the lixiviation process at a subsequent step. I have found that this releasing can be effected when the zinc is present in any one of its spinel combinations.

After the mass has been subjected for a sufficient length of time to the action of the heating and reducing materials (without reaching, as above described, the zinc reducing temperature point) it is in condition to be delivered to the lixiviation apparatus. The latter may be of any of the ordinary forms suitable for such work. The zinc bodies now respond to the acid solvent and are carried off in solution, the zinc in the residue being reduced to the minimum.

After this second extraction of zinc by solution, the solid residue may, if commercially justified, be subjected, as in the ordinary practice, to such treatment as is required for the withdrawal of gold, silver, lead, or the like.

The solution taken away from the lixiviation apparatus may be subjected to any further treatment which is suitable for separating the zinc.

Passing to the second way of using my improved zinc ore treatment above referred to, that is, turning to the treatment of an ore mass which initially contains zinc in a form which is, or can readily be made, soluble and also contains it in spinel form or other insoluble form.

I will assume a zinc-bearing ore of the sulfid class in finely crushed condition. I first treat it in a manner more or less similar to that ordinarily followed in using a desulfurizing furnace, applying the heat in such way and at such degree that the sulfur will be as completely as possible converted into sulfate. I then take the furnace-treated masses and mix with them a suitable reducing agent as coal. Then I subject them, in the way above described, to a relatively low temperature, namely a temperature below that at which zinc is reduced and volatilized, maintaining them at a low heat for a length of time depending upon the constitution and character of the ore. The first furnace treatment put into soluble condition that portion of the zinc which is ordinarily made soluble by a careful sulfatizing roasting. The second part of the zinc in the original mass is, by the second low-heat treatment in the presence of the reducing agent, put into the condition above described where it will also respond to the action of the solvent during lixiviation.

When utilizing my method in this latter manner there is required but one passage of a solvent through the mass; there being in this case no body corresponding to the zinc containing residue which is involved in describing the first use of the process.

The above description has been specific in many respects for the purpose of clearness; but, I do not wish to be understood as thereby limiting the scope of my invention.

For example, where I have referred to the desulfurizing, roasting or heating of the ore on a furnace hearth, it will be understood that it can be treated in furnaces of other well known sorts, such as rotary cylinders, or multiple hearth furnaces.

Again, it is immaterial, as concerns the broader phases of my invention, as to whether the lixiviation treatment is followed by an electrolytic action or any other that may be preferred for separating the metal from the solution.

In another application, Serial No. 319,266, filed August 22, 1919, I have presented claims for some of the subject matter herein described.

I herein claim the process which involves subjecting the ore to the action of a solvent after a preliminary treatment, and subjecting it again to the action of a solvent after an intermediate treatment substantially such as described.

What I claim is:

The herein described method for treating ore containing zinc sulfid and also other forms of zinc, it consisting in roasting the ore and forming soluble zinc bodies, subjecting the mass to the action of a solvent and dissolving out the soluble zinc component, then commingling with the solid residue a reducing agent and subjecting the mingled mass to the action of heat at a temperature below that at which zinc reduces and volatilizes, then again subjecting the mass to the action of a solvent and dissolving out the remainder of the zinc component.

In testimony whereof, I affix my signature.

RICHARD L. LLOYD.